United States Patent [19]

Kochi et al.

[11] Patent Number: 4,959,743
[45] Date of Patent: Sep. 25, 1990

[54] JITTER REDUCING TAPERED ROTARY DRUM FOR MAGNETIC HEAD APPARATUS

[75] Inventors: Mashanori Kochi, Katsuta; Juichi Morikawa, Katsuta; Makoto Ibe, Katsuta; Shinji Ozaki, Funabashi; Hitoshi Takizawa, Katsuta, all of Japan

[73] Assignee: Hitachi, Ltd., Tokyo, Japan

[21] Appl. No.: 219,268

[22] Filed: Jul. 15, 1988

[30] Foreign Application Priority Data

Jul. 24, 1987 [JP] Japan .................................. 62-183406

[51] Int. Cl.⁵ .............................................. G11B 15/61
[52] U.S. Cl. ................................... 360/130.24; 360/84
[58] Field of Search ................. 360/84, 130.22, 130.23, 360/130.24, 107

[56] References Cited

U.S. PATENT DOCUMENTS

| | | | |
|---|---|---|---|
| 4,306,262 | 12/1981 | Takano | 360/130.24 |
| 4,719,528 | 1/1988 | Sato | 360/130.24 |
| 4,725,910 | 2/1988 | Kaku et al. | 360/130.24 |
| 4,839,762 | 6/1989 | Koreda et al. | 360/130.24 |

FOREIGN PATENT DOCUMENTS

| | | | |
|---|---|---|---|
| 0030845 | 6/1984 | Japan . | |
| 0000645 | 1/1985 | Japan | 360/130.24 |
| 0119658 | 6/1985 | Japan | 360/130.24 |
| 0199214 | 9/1986 | Japan | 360/130.24 |

*Primary Examiner*—David J. Severin
*Attorney, Agent, or Firm*—Antonelli, Terry, Stout & Kraus

[57] ABSTRACT

A rotary magnetic head drum apparatus is constituted by at least one video head, a rotary drum having a tape running surface and a head mounting surface to which the video head is securely mounted, and a stationary drum provided with a tape guide and a tape running surface. In the rotary magnetic head drum apparatus, the tape running surface or the rotary drum has a lower end portion which is formed with a tapered portion whose diameter becomes gradually smaller along the axis of the rotary drum, and the tapered portion is projected such that its bottom end surface is located below the plane of the head mounting surface.

4 Claims, 7 Drawing Sheets

F I G. 5
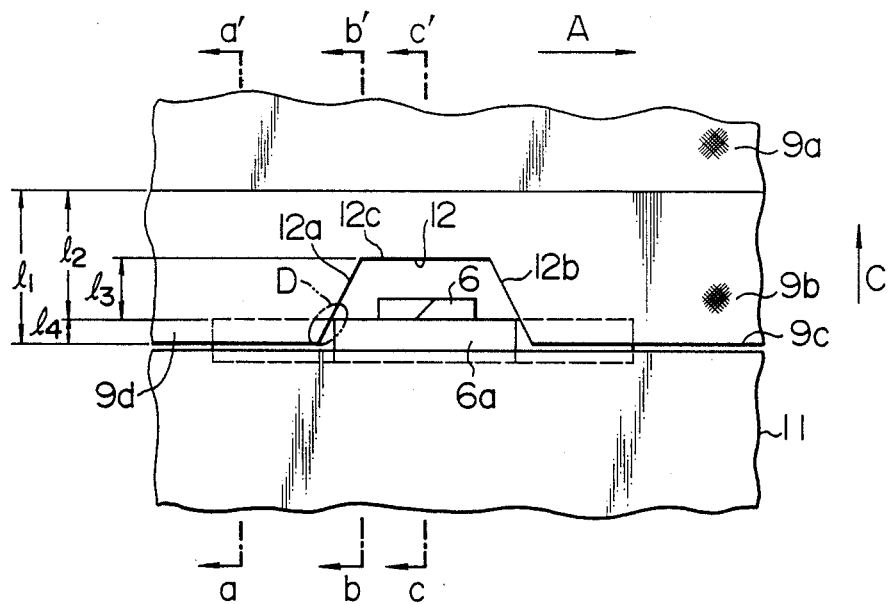
F I G. 6A  F I G. 6B  F I G. 6C
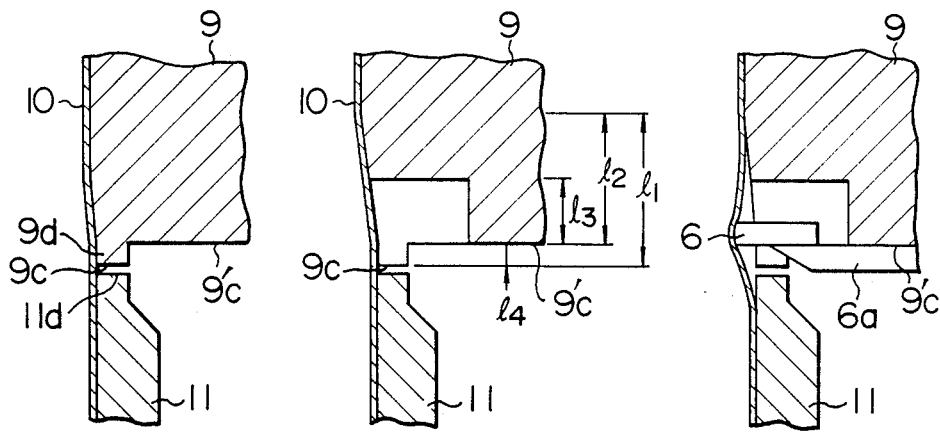

4,959,743

JITTER REDUCING TAPERED ROTARY DRUM FOR MAGNETIC HEAD APPARATUS

BACKGROUND OF THE INVENTION

The present invention relates to a rotary magnetic head drum apparatus suitable for use in a helical scan-type magnetic recording and reproducing system.

As disclosed in Japanese Utility Model Unexamined Publication No. 59-89449, a conventional type of rotary magnetic head drum apparatus comprises an upper drum (rotary drum) provided with video heads and an lower drum (stationary drum) located in opposition to the bottom of the rotary drum. A magnetic tape is looped around a portion of the outer circumference of the drum apparatus, and tracks of recorded signals are formed on the magnetic tape in a direction oblique to the length thereof. In such a drum apparatus, the diameter of the rotary drum is larger than the diameter of the stationary drum, and a taper is formed around the circumference of a lower edge portion of the rotary drum such that the minimum diameter of the tapered lower edge portion is not smaller than the diameter of the stationary drum.

As shown in FIGS. 1, 2A and 2B, the taper is formed around the circumference of the lower portion 109b of a rotary drum 109 that opposes the top of a stationary drum 111. Windows (one of which is illustrated at 112) are formed in the tapered portion for allowing a portion of a video head 106 to project from the window 112. The video head 106 is fixed to a bottom end surface 109c of the rotary drum 109.

The advantage of such a drum apparatus as described above is that it is possible to prevent a thin magnetic tape of a high-density recording type from squeaking due to a sticky slip occurring between the tape and the stationary drum.

However, such a conventional type of drum apparatus gives no consideration to a stable contact (see FIG. 2B) between a magnetic tape 110 and an edge portion of the window 112 which is formed in the side surface of the rotary drum 109 and through which is projected a part of the video head 106 fixed to the bottom end surface 109c of the rotary drum 109. As a result, jitters may occur in synchronization with the cycle of drum rotation.

SUMMARY OF THE INVENTION

It is therefore an object of the present invention to provide a rotary magnetic head drum apparatus which is arranged to reduce the jitters which occur due to the unstable contact between a magnetic tape and an edge portion of a window in synchronization with the cycle of drum rotation.

To achieve the above and other objects, in accordance with the present invention, the tape-running surface of a rotary drum has a lower end portion whose entire circumference is tapered so that its diameter becomes gradually smaller in the downward direction, and which tapered lower end portion extends downwardly beyond a surface of the rotary drum to which video heads are fixed.

In accordance with the present invention, since it is possible to lessen disturbance due to the shock occurring when a traveling tape comes into contact with the edge portions of windows, the jitter component occurring due to the disturbance in synchronization with the rotation of the rotary drum can be greatly reduced.

The above and other objects, features and advantages of the present invention will become apparent from the following description of preferred embodiments of the present invention, taken with reference to the accompanying drawings.

BRIEF DESCRIPTION OF THE DRAWINGS

FIG. 5 is an enlarged front elevational view of the essential portion of the apparatus shown in FIG. 4;

FIGS. 6A, 6B and 6C are fragmentary sectional views taken along the lines a—a', b—b' and c—c' of FIG. 5, respectively;

DESCRIPTION OF THE PREFERRED EMBODIMENTS

Figure 4:
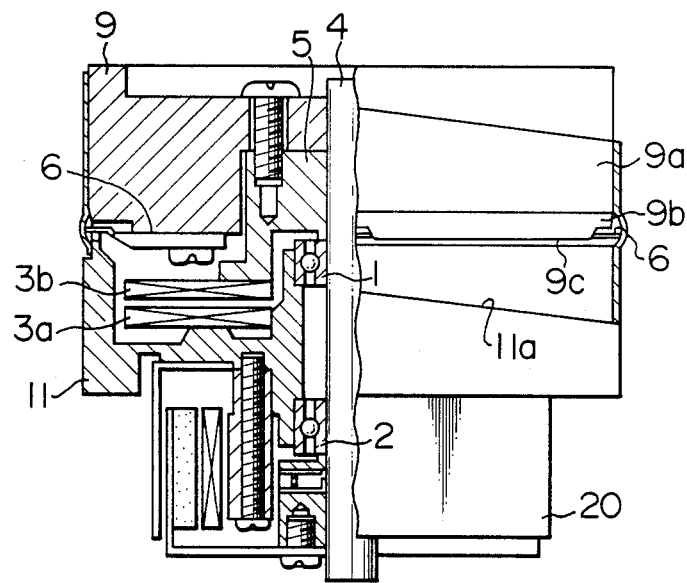
FIG. 4 is a side elevational view, with a portion in section, of the apparatus shown in FIG. 3.

Referring to FIG. 4, a motor is represented at 20, and a stationary drum 11 is formed with a tape guide 11a. The stationary drum 11 is secured via ball bearings 1 and 2 to a rotary shaft 4 of the motor 20. A stator transformer 3a and a rotor transformer 3b are provided in face-to-face relationship as illustrated in the stationary drum 11. A rotary drum 9 is secured to the rotary shaft 4 by means of a rotary disk 5.

As is clearly shown in FIGS. 5, 6A, 6B and 6C, the rotary drum 9 is provided with a tape guide surface 9a which is perpendicular to a reference surface (horizontal surface) and another tape guide surface 9b which extends from the lower edge of the tape guide surface 9a to a bottom end surface 9c of the rotary drum 9, the tape guide surface 9b having a taper formed around its circumference so that the diameter of the surface 9b becomes gradually smaller in the axial direction of the drum 9. The bottom end portion 9c of the tapered tape guide surface 9b projects by a dimension $l_4$ downwardly from the plane of a head mounting surface 9'c of the rotary drum 9 to form a projecting portion 9d. The bottom end of the projecting portion 9d, that is, the bottom end portion 9c opposes a top end surface 11b of the stationary drum 11. In this manner, the tapered tape guide surface 9b of the rotary drum 9 is provided with the projecting portion 9d which extends downwardly from the bottom side of a video head 6, and the bottom end surface of the projecting portion 9d is located closely to the top surface 11b of the stationary drum 11. With this arrangement, it is possible to prevent a magnetic tape 10 from protruding into the gap between the lower edge of the rotary drum 9 and the upper edge of the stationary drum 11 during rotation of the rotary drum 9. In addition, as will be described later, the magnetic tape 10 can be prevented from striking the edge of a window 12 during rotation of the rotary drum 9. Although a plurality of windows are formed in practice, a single window is illustrated in this example for the sake of clarity. Therefore, the extent of disturbance which adversely affects the rotation of the rotary drum 9 is lessened. This lessening effect can be improved by forming the configuration of the window 12 into a shape with slanted angles.

In order to prevent the magnetic tape from striking the edge portion of the window 12, it is preferable that $l_2$ is larger than $l_3$ as viewed in FIGS. 5 and 6B and that $l_4$ is as great as possible since the gap between the rotary drum 9 and the stationary drum 11 becomes small and the amount of protrusion of the tape can be made small. However, if $l_4$ is made too large, the gap will be too narrow and the lower end of the rotary drum 9 may comes into contact with the upper end of the stationary drum 11 during rotation of the rotary drum 9 by the influence of a shock or other external forces. Accordingly, it is suitable to select $l_4$ so that the gap may be 0.1 mm in dimension.

The window 12 is formed so that the video head 6 is partially projected into the exterior. In the present embodiment, the window 12 is constituted by a cutout which extends upwardly from the lower end surface 9c of the rotary drum 9. The window or cutout 12 has a leading end surface 12b and a trailing end surface 12a as viewed in the direction A of rotation of the rotary drum 9 as well as a bottom end surface 12c which opposes the top of the stationary drum 11. Both leading and trailing end surfaces are formed in a tapered manner such that the distance between both opposed end surfaces gradually diminishes toward the bottom end surface 12c. More specifically, when the cutout 12 is viewed from the outside of the rotary drum 9 toward the radially inward portion, that is, when the cutout 12 is viewed from above the plane of FIG. 5, the configuration of the cutout 12 is a trapezoidal form having a width which gradually diminishes from the vicinity of the video head 6 to the bottom end surface 12c, that is, in the direction indicated by an arrow C.

Figure 1:
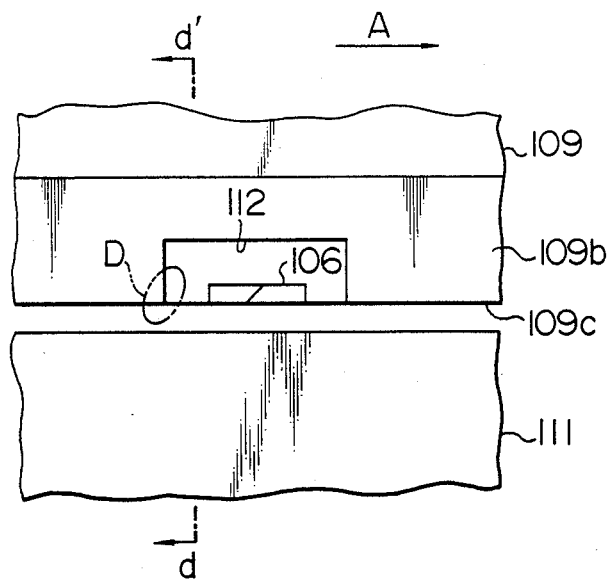
FIG. 1 is a schematic front elevational view of the essential portion of a conventional type of rotary magnetic drum apparatus.
Figure 2A:
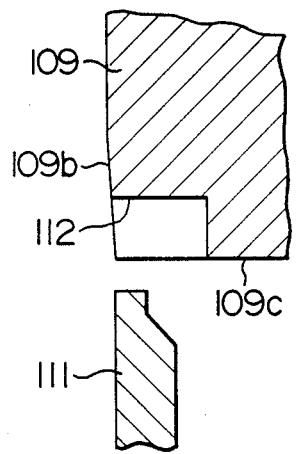
FIG. 2A is an essential cross-sectional view taken along the line d-13 d' of FIG. 1.
Figure 2B:
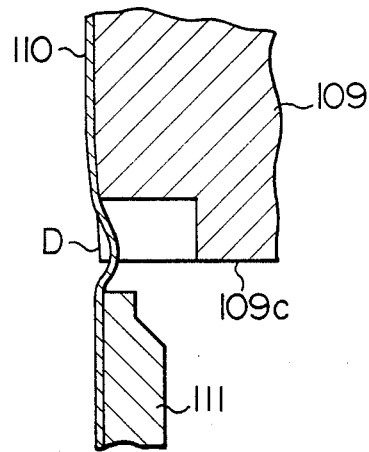
FIG. 2B is a view similar to FIG. 2A, with a magnetic tape looped around drums.
Figure 3:
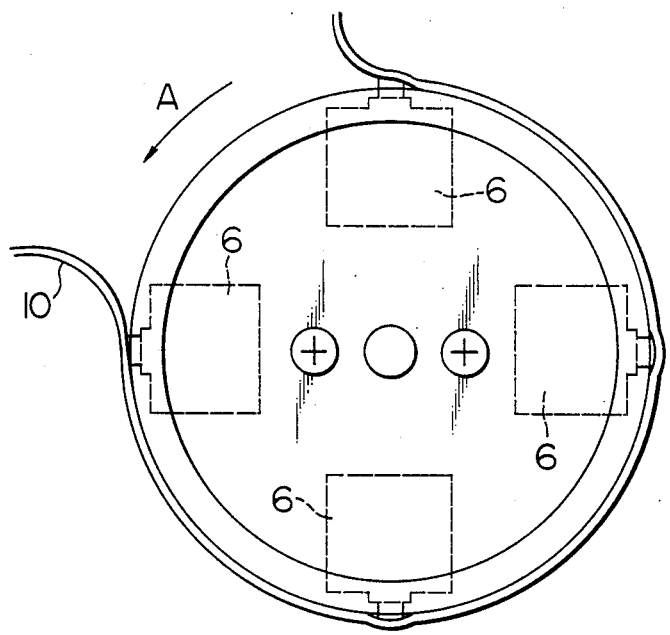
FIG. 3 is a schematic plan view, with nonvisible video heads illustrated, of the essential portion of a rotary magnetic drum head apparatus according to one embodiment of the present invention.

As compared with the window or cutout 112 having the uniform width shown in FIG. 1, the cutout 12 having such a configuration is reduced in opening area and the amount of protrusion of a magnetic tape into the cutout 12 decreases. Furthermore, since the angle between each of the end surfaces 12a and 12b and the bottom end surface 12c of the cutout 12 is obtuse, the stream of air in the cutout 12 is relatively smoothed, so that the turbulence of the air stream can be lessened. For this reason, the vibration of the magnetic tape is greatly reduced.

Each of the video heads 6 is fixed to the head mounting surface 9'c of the rotary drum 9 through a head base 6a.

Figure 7A:
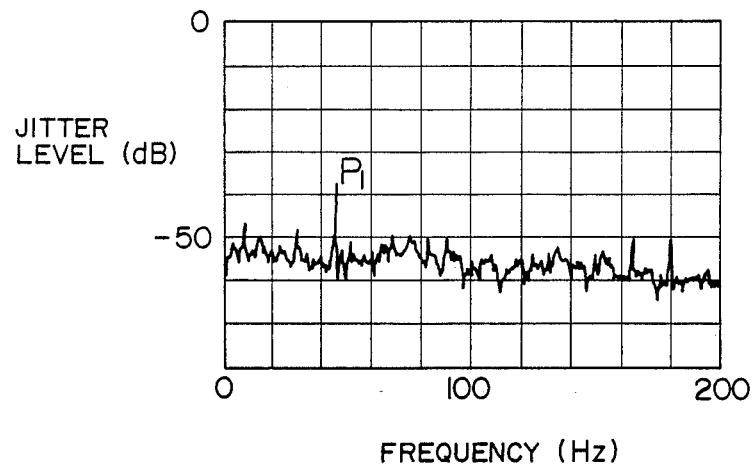
FIG. 7A is a chart showing the characteristic of an example of a prior art apparatus.
Figure 7B:
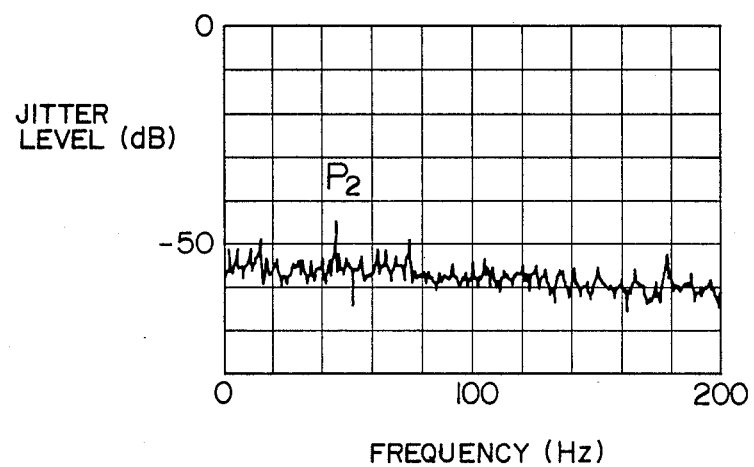
FIG. 7B is a chart showing the characteristic of an apparatus according to the embodiment of the present invention.

FIGS. 7A and 7B are characteristic charts showing the data of spectral analysis of the jitters of the rotary magnetic head drum apparatuses. FIG. 7A shows the characteristic of the apparatus according to the prior art shown in FIG. 1, and FIG. 7B shows the characteristic of the apparatus according to the present embodiment shown in FIG. 4.

It is to be noted that these spectral analyses were obtained by extracting a jitter component from the video output of a VTR device by means of a jitter meter and analyzing the component by a spectrum analyzer.

In FIGS. 7A and 7B, peak values $P_1$ and $P_2$ each represent the jitter value of jitters which are introduced into a rotation component when the rotation of the rotary drum is disturbed each time a magnetic tape comes into contact with the edge of the window formed in the rotary drum. As is evident from these figures, with the embodiment of the present invention, the level of the disturbance component introduced by the magnetic tape can be reduced by about 6 dB.

Figure 8:
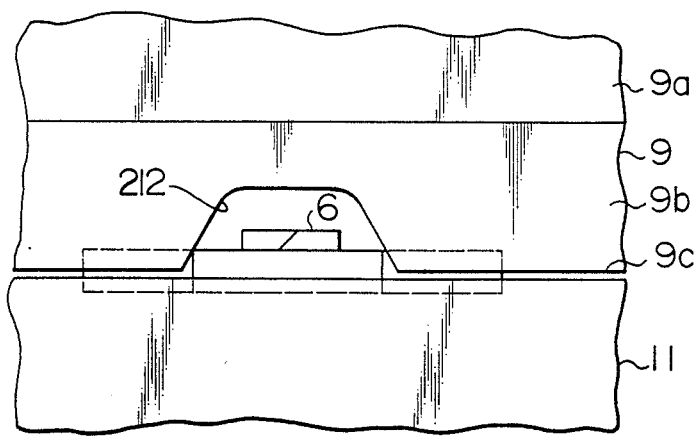
FIGS. 8 to 13 are respectively fragmentary enlarged views of the essential portions of other embodiments of the present invention.
Figure 12:
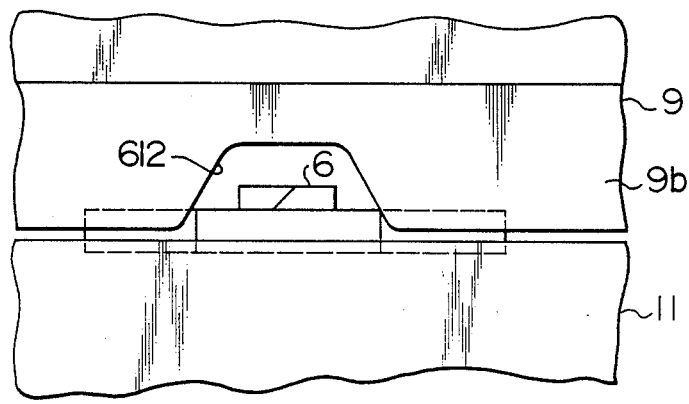

As shown at 212 and 612 in FIGS. 8 and 12, respectively, some or all of the corners of the cutout may be rounded.

Figure 9:
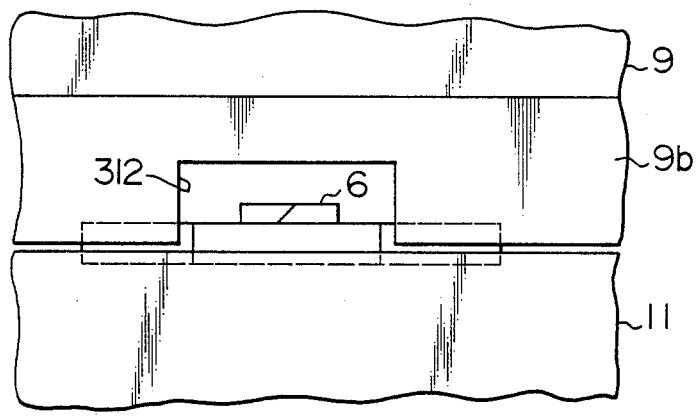
Figure 10:
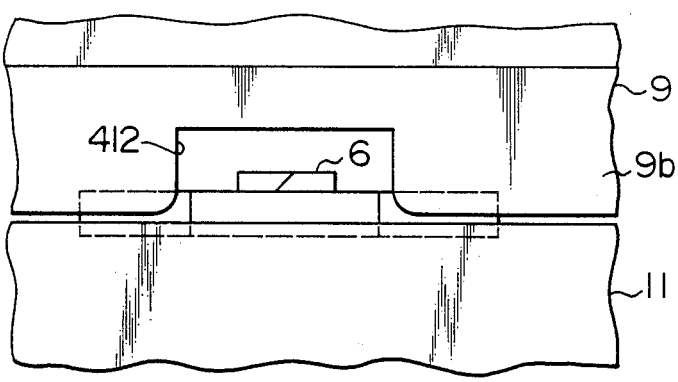
Figure 11:
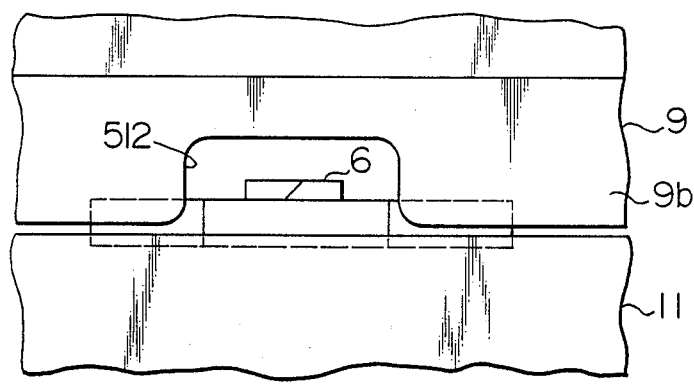

As shown at 312, 412 and 512 in FIGS. 9, 10 and 11, respectively, the cutout may have a rectangular form and some or all of the corners thereof may be rounded.

Figure 13:
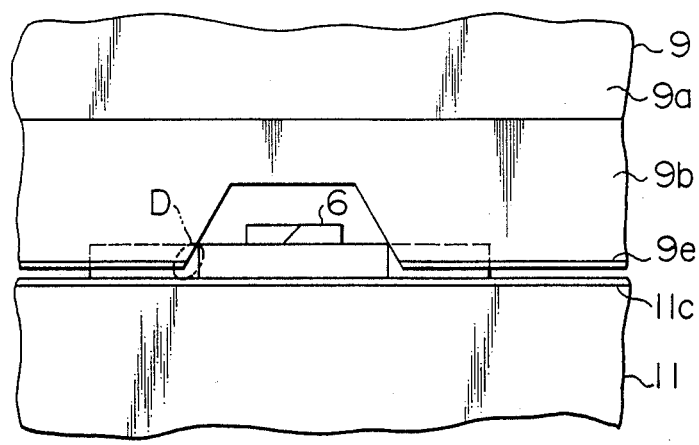
Figure 14:
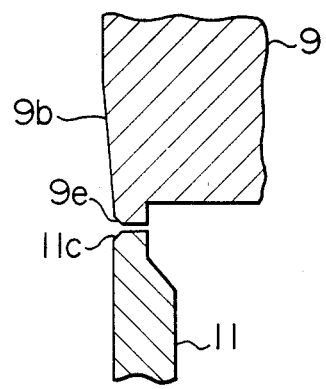
FIG. 14 is a schematic cross sectional view of the essential portion of the apparatus shown in FIG. 13.

Referring to FIGS. 13 and 14 which show another embodiment of the present invention, the lower end of the tapered tape guide surface 9b of the rotary drum 9 and the upper end of the stationary drum 11 have chamfers 9b and 11c as small as 0.02 mm wide, respectively, on a tape-running side thereof. With this embodiment, it is possible to further lessen the shock occurring when the magnetic tape strikes the edge of the window and hence to reduce jitters.

Figure 15:
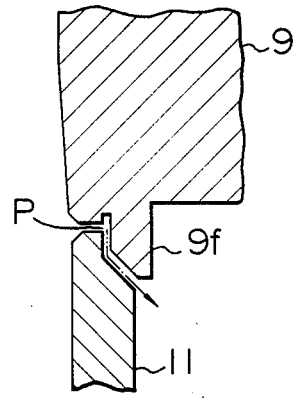
FIG. 15 is a schematic cross sectional view of the essential portion of an apparatus according to a still further embodiment of the present invention.

Referring to FIG. 15, which shows still another embodiment of the present invention, the lower end of the tapered tape guide surface 9b of the rotary drum 9 may be formed with an extension 9f which extends toward the stationary drum 11 so that resistance P against an air flow can be increased between the outer circumference of the extension 9f and the upper end portion of the stationary drum 11. It is thus possible to reduce the floating of a magnetic tape during rotation of the rotary drum 9 and hence to further reduce the level of jitters.

What is claimed is:

1. A rotary magnetic head drum apparatus comprising at least one video head, a rotary drum having an axis of rotation, a tape running surface and a head mounting surface to which said video head is securely mounted, and a stationary drum provided with a tape guide and a tape running surface, wherein said tape running surface of said rotary drum has an upper portion extending parallel to the axis of rotation of the rotary drum and a lower end portion whose diameter becomes gradually smaller along the axis of rotation of said rotary drum, said lower end portion being projected such that a bottom end surface thereof is located below a plane of said head mounting surface of said rotary drum, said lower end portion having at least one window through which a part of said video head is exposed, wherein a lower end of said lower end portion of said rotary drum and an upper end of said tape running surface of said stationary drum have chamfered edges.

2. A rotary magnetic head drum apparatus according to claim 1, wherein a lower end of said lower end portion of said rotary drum has a projection which extends from said lower end toward said stationary drum.

3. A rotary magnetic head drum apparatus according to claim 1, wherein said window is a cutout which extends upwardly from a lower end of said rotary drum, said cutout being defined by opposed edge surfaces which are formed in a tapered shape and a side surface which is formed to cross said opposed side surfaces.

4. A rotary magnetic head drum apparatus according to claim 3, wherein said cutout includes rounded corners.

* * * * *

UNITED STATES PATENT AND TRADEMARK OFFICE
CERTIFICATE OF CORRECTION

PATENT NO. : 4,959,743
DATED : Sep. 25, 1990
INVENTOR(S) : Kochi, et al

It is certified that error appears in the above-identified patent and that said Letters Patent is hereby corrected as shown below:

On the title page,
--[73] Assignee:   Hitachi, Ltd., Tokyo, Japan and
                  Hitachi Video Engineering, Incorporated,
                  Yokohama, Japan.--

Signed and Sealed this

Second Day of February, 1993

*Attest:*

STEPHEN G. KUNIN

*Attesting Officer*     *Acting Commissioner of Patents and Trademarks*